Sept. 29, 1936.   N. MORRIS   2,056,109
ROASTING PAN RACK
Filed July 19, 1935

Inventor

*Natalie Morris*

By *Clarence A. O'Brien*
Attorney

Patented Sept. 29, 1936

2,056,109

UNITED STATES PATENT OFFICE 2,056,109

ROASTING PAN RACK

Natalie Morris, Plaquemine, La.

Application July 19, 1935, Serial No. 32,264

1 Claim. (Cl. 53—6)

This invention appertains to new and useful improvements in racks for roasting pans. When roasting turkeys or other fowls, the breast generally becomes dry as it is placed in the pan with the breast up. To have a well-flavored and juicy breast it is necessary to have the breast portion turned down during roasting.

The principal object of the present invention is to provide a rack for roasting pans wherein a fowl can be properly supported in a breast-down position.

The following specification will disclose other important objects and advantages to the reader.

Figure 1:
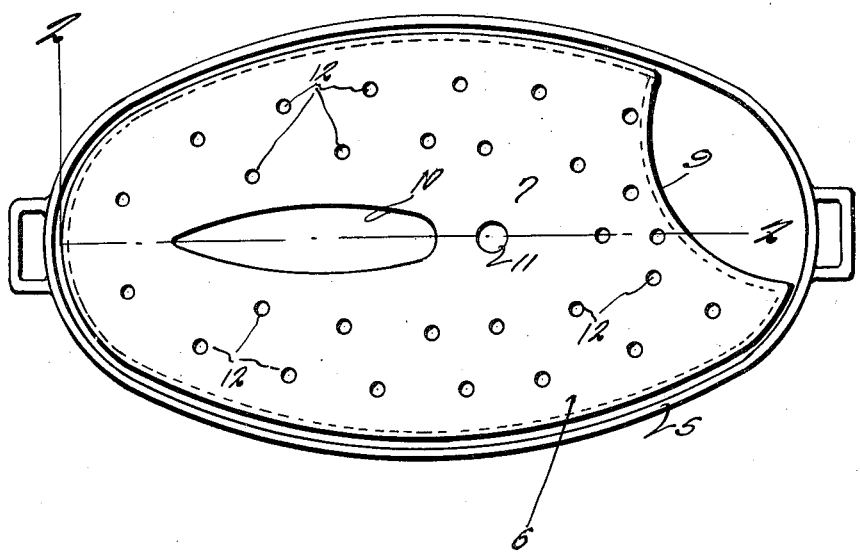
Figure 1 represents a top plan view of the pan.
Figure 2:
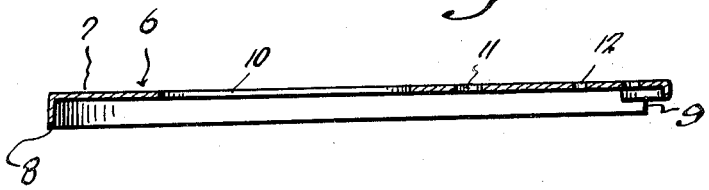
Figure 2 represents a longitudinal section taken substantially on line 2—2 of Figure 1.

In Figure 1, numeral 5 represents the roasting pan and numeral 6 generally refers to the novel rack for disposition therein. This rack 6 consists of the top supporting plate 7 which at its perimeter is provided with a depending supporting flange 8. The plate 7 is provided with an arcuate cut-away portion 9 at one end as shown in Figure 1.

An elongated acute angular shaped opening 10 is provided in the plate 7 more toward the opposite end from the cut-away portion 9 to accommodate the breast bone of the fowl. With the breast bone extending into this opening 10, the fowl will be retained in an upright position while breast downward.

The plate 7 is furthermore provided with suitable openings 11 and 12.

While the foregoing specification sets forth the invention in specific terms it is to be understood that numerous changes in the shape, size and materials may be resorted to without departing from the spirit and scope of the invention as claimed.

Having thus described the invention, what is claimed as new is:

A roasting pan rack comprising a plate provided with supporting means, said plate being provided with an elongated opening, one end of the opening being of acute angular constriction to permit the breast bone of a fowl to be wedged therein.

NATALIE MORRIS.